United States Patent [19]

Skillen et al.

[11] Patent Number: 4,800,681
[45] Date of Patent: Jan. 31, 1989

[54] SEALING AND GUIDING ELEMENT FOR FLUSH MOUNTED MOVABLE AUTOMOBILE WINDOW

[75] Inventors: John D. Skillen, Keokuk, Iowa; Melvin S. Coons, Marion, Ind.; Olav H. Brannstrom, Troy, Mich.

[73] Assignee: Sheller-Globe, Inc., Toledo, Ohio

[21] Appl. No.: 18,551

[22] Filed: Feb. 25, 1987

Related U.S. Application Data

[63] Continuation-in-part of Ser. No. 826,762, Feb. 6, 1986, Pat. No. 4,649,668.

[51] Int. Cl.⁴ .............................. E06B 7/16
[52] U.S. Cl. ........................ 49/440; 49/374; 49/441; 49/502
[58] Field of Search ............ 49/374, 502, 440, 441, 49/376, 377, 378, 227, 488

[56] References Cited

U.S. PATENT DOCUMENTS

| | | | |
|---|---|---|---|
| 3,479,768 | 11/1969 | Smadja | 49/441 |
| 4,196,546 | 4/1980 | Bright | 49/440 X |
| 4,240,227 | 12/1980 | Hasler et al. | 49/374 X |
| 4,357,781 | 11/1982 | Ohya et al. | 49/227 |
| 4,454,688 | 6/1984 | Rest et al. | 49/440 X |
| 4,470,223 | 9/1984 | Mesnel | 49/441 |
| 4,561,211 | 12/1985 | Raley et al. | 49/227 X |
| 4,571,888 | 2/1986 | Jensen | 49/374 X |
| 4,614,061 | 9/1986 | Brocke | 49/440 |

FOREIGN PATENT DOCUMENTS

| | | |
|---|---|---|
| 0040587 | 5/1981 | European Pat. Off. . |
| 0234163 | 12/1986 | European Pat. Off. . |
| 2827372 | 6/1978 | Fed. Rep. of Germany . |
| 3236168 | 4/1984 | Fed. Rep. of Germany ........ 49/374 |
| 2438731 | 10/1979 | France . |
| 60-206717(A) | 10/1985 | Japan . |
| 992673 | 8/1962 | United Kingdom . |
| 2085513 | 4/1982 | United Kingdom .......... 49/441 |
| 2140065A | 5/1984 | United Kingdom . |

Primary Examiner—Philip C. Kannan
Attorney, Agent, or Firm—Foley & Lardner, Schwartz, Jeffery, Schwaab, Mack

[57] ABSTRACT

The sealing and guiding element comprises a single structure which defines at least three sides of an automotive window track and provides the sealing and guiding structures for the window. The sealing and guiding element may have a unitary body or may be formed of a plurality of individual elements connected together before installation on an automotive body. The sealing and guiding element may also include trim pieces for the exterior of the automobile and may be unitarily molded with other functional elements of the automobile such as mirror housings or the like.

14 Claims, 9 Drawing Sheets

SEALING AND GUIDING ELEMENT FOR FLUSH MOUNTED MOVABLE AUTOMOBILE WINDOW

CROSS REFERENCE TO RELATED APPLICATIONS

This is a continuation-in-part of U.S. application Ser. No. 826,762 filed Feb. 6, 1986, now U.S. Pat. No. 4,649,668.

BACKGROUND OF THE INVENTION

Field of the Invention

This invention relates to sealing elements for automobiles and more particularly to sealing elements for flush mounted vehicle windows.

Discussion of Related Art

In the design of modern automobiles, it is well-known that a low coefficient of drag of the vehicle body provides enhanced performance and reduced fuel consumption. Thus, one constraint of modern design engineers is the drag coefficient. In order to reduce it, vehicle windows may be designed to be flush or substantially flush with the outer surface of the vehicle body. However, it is very difficult to seal a flush mounted movable window against the elements. It is therefore desirable to have some type of outer window guide member to prevent the window from moving away from the vehicle body leaving air gaps. At the same time, any such outer guide member must be relatively thin so that the window will still be substantially flush mounted. Further, the outer guide member must be easily mounted to the vehicle.

SUMMARY OF THE INVENTION

One object of the present invention is to provide a sealing element for a flush mounted movable vehicle window which will provide a positive seal against the window by inhibiting outward movement of the window, yet permit a substantially flush window configuration.

Another object of the present invention is to provide a sealing element for flush mounted windows which provides an exterior appearance which is aesthetic.

A further object of the present invention is to provide a sealing element for flush mounted windows in which the outer members for a window or a group of windows is formed as an integral modular unit with a plurality of inner sealing members attached to the integral unit to complete the sealing element.

A still further object of the present invention is to provide a sealing element having a relatively rigid outer member with a soft sealing lip which is attached to the outer member either by being molded into the material of the outer member or by being attached through a post-assembly process.

In accordance with the above and other objects, the present invention is a sealing element for a flush mounted window of an automobile, comprising a first generally U-shaped member having an outer wall and an inner wall. The outer wall is formed of a shape-sustaining material to act as an outer guide for a movable vehicle window. A second generally U-shaped member is formed separately from the first U-shaped member and has a pair of legs which are spaced sufficiently to receive the inner wall of the first U-shaped member and a mounting flange so as to clamp the inner wall to the mounting flange. A sealing lip is mounted to the second U-shaped member and extends toward the outer wall of the first U-shaped member when the inner wall is received between the pair of legs. The second U-shaped member may comprise a hard, flexible core covered with a softer material.

The first generally U-shaped member may comprise a plastic shape-sustaining material. Alternatively, the first generally U-shaped member may also comprise a hard, flexible core covered with a softer material.

A plurality of the first U-shaped members may be formed as a single modular unit to enclose three sides of the movable window opening. A plurality of second U-shaped members may be attached individually to the modular unit to form a complete sealing element for the movable window.

The first generally U-shaped member may also have an external mounting flange formed integrally and the elements glued or otherwise attached to the external mounting flange. The external mounting flange may be attached to a recess in the vehicle body to aid in the flush mounting of the window.

An alternative form of the sealing element may comprise a one-piece construction having an S-shape wherein one portion of the S is formed of a hard plastic material and the other portion of the S is formed of a metal core with a soft covering. This form of the sealing element may be manufactured using a dual extrusion process.

BRIEF DESCRIPTION OF THE DRAWINGS

The above and other objects will become more readily apparent as the invention is more fully understood from the detailed description to follow, reference being made to the accompanying drawings in which like reference numerals represent like parts throughout, and in which.

DETAILED DESCRIPTION OF THE PREFERRED EMBODIMENTS

Figure 1:
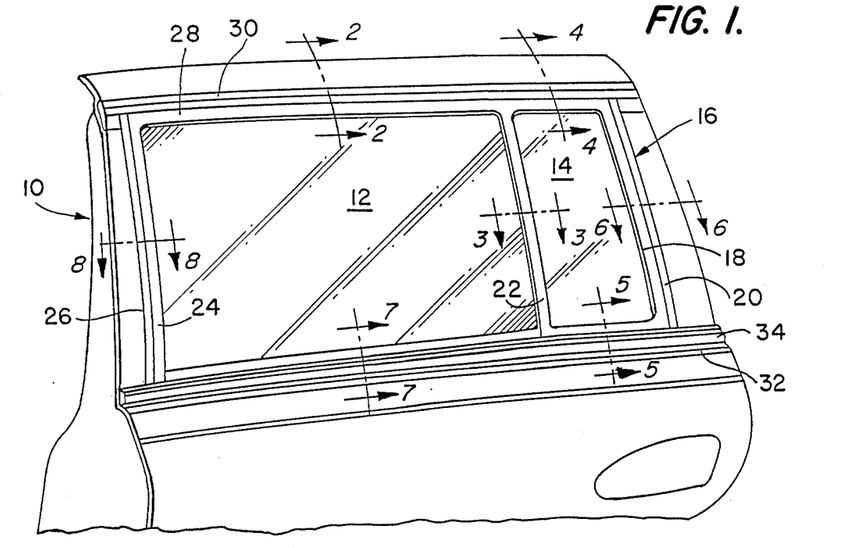
FIG. 1 is a perspective view of a vehicle door having flush windows and a modular sealing element the present invention;.

FIG. 1 shows a vehicle door 10 incorporating a modular sealing element system according to the present invention. Door 10 is shown to be a rear door having a vertically slidable window 12 and a fixed window 14. A one-piece molded outer sealing unit 16 surrounds both windows. The sealing unit 16 includes a first vertical portion 18 which mounts a first trim member 20, a second vertical portion 22, and a third vertical portion 24, which mounts a trim member 26. The sealing unit 16 also includes a horizontal portion 28 which mounts a trim member 30 and a second horizontal portion 32 which mounts a trim member 34. The horizontal portions 28 and 32 are shown to extend for the entire length of the door 10.

Sealing unit 16 is molded from any suitably hard material such as polyurethane, thermoset plastic or the like. After manufacture, the trim elements 20, 26, 30 and 34 may be conveniently mounted, as will be described hereinbelow, and the unit can be mounted to the door. The unit 16 is formed to fit into recesses in the door, as will become apparent below.

Sealing unit 16 is suited to being mounted by automated equipment since it is rigid and can be installed by moving it normally into the window opening. Unit 16 is held in place by glue against a mounting flange and the door sheet metal. Additional sealing members are then added inside.

It will be noted that while unit 16 is shown to be configured to attach to the rear door of a vehicle, the present invention is applicable to any vehicle opening in which sliding windows are present. In particular, the invention can be used for a front door in which case the housing for an external rear view mirror attached to the door can be formed unitarily with the unit 16. In other words, unit 16 can be formed to include fixed window frames, mirror housings, trim molding mounts, window trim, etc. This type of construction greatly facilitates manufacture of the vehicle door since the unit 16 can be preformed and glued (as will be discussed in greater detail below) in place with all of the necessary door and window pieces already attached.

Figure 2:
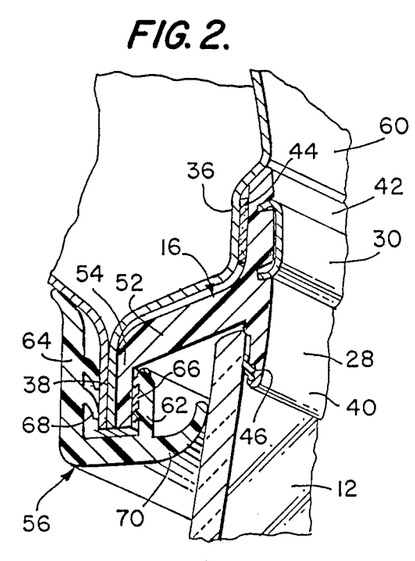
FIG. 2 sectional view taken along line 2—2 of FIG. 1.

FIG. 2 shows the upper horizontal portion 28 in greater detail. As can be seen in FIG. 2, the sheet metal of the door has an indentation 36 and terminates in a flange 38 formed by inner and outer door structural members. Flange 38 is recessed from indentation 36.

The horizontal portion 28 of unit 16 includes a lower flange 40 and an upper flange 42. Lower flange 40 acts as a window guide to rigidify the window and keep it from moving outwardly in the window opening. Upper flange 42 mounts trim strip 30 which can be glued or otherwise held in place. Upper flange 42 is received in recess 36 and may be glued in place by the use of double-sided tape 44 or the like.

Since unit 16 is formed from a relatively rigid material, it is necessary to utilize a softer material to form a sealing lip 46 which extends inwardly from flange 40 to contact movable window 12. There are several alternate methods for adding the sealing lip 46, as will be discussed below.

Portion 28 extends inwardly at 52 to form the upper part of the window frame and then extends downwardly to form a flange 54 which runs parallel to flange 38. Flange 54 may be glued to flange 38 to stabilize unit 16.

The purpose of the present invention is to enable window 12 to be essentially flush mounted and for the vehicle exterior surface to be essentially smooth. Accordingly, the thickness of upper flange 42 must be approximately the same as the depth of recess 36 so that its outer surface forms a continuation of the outer surface 60 of the door. Also, lower flange 40 must be sufficiently thin to enable window 12 to be substantially flush mounted yet must be sufficiently thick to provide the rigid support required. It has been found that by reaction injection molding polyurethane to form unit 16 with a hardness of 100 Durometer on the shore D scale and by making the flange 40 with a thickness of approximately 0.09 inch, the desired flush mounting can be achieved as well as the desired structural rigidity. The flange 40 will be able to flex slightly but will be rigid against outward movement of window 50.

A sealing member 56 is applied over flanges 38 and 54. Member 56 is generally U-shaped and has legs 62 and 64 having flexible fingers 66 and 68, respectively, which apply a force holding flange 54 and flange 38 together A flexible sealing lip 70 extends from the bottom of leg 62 and seals against the inside surface of window 12.

Sealing lips 46 and 70 may be flocked as is conventional to enhance the sealing effect and reduce friction. The outer surface of member 56 may be covered with material, colored or the like, in order to act as an interior trim element.

Figure 3:
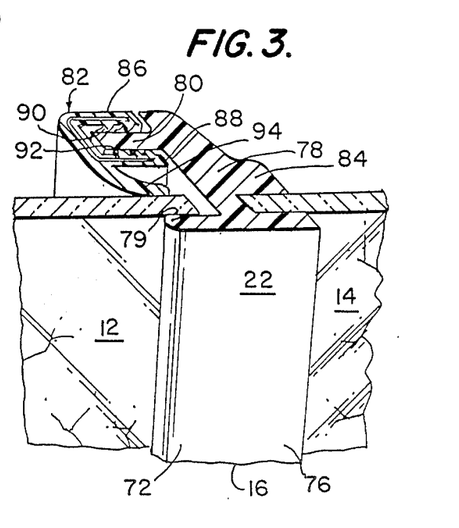
FIG. 3 is a sectional view taken along line 3—3 of FIG. 1.

FIG. 3 shows the vertical portion 22 in greater detail. It will be seen that this portion of unit 16 includes a flange 72 with a sealing lip 74 pressed against window 12. A flange 76 extends over the outer surface of fixed window 14. A portion 78 extends inwardly of the vehicle and contains a flange 80 which mounts an inner sealing member 82. Portion 78 also includes an enlarged member 84 which, together with flange 76, forms a channel which receives the fixed window 14. Window 14 may be glued or otherwise held within this channel.

Sealing member 82 is similar to sealing member 56 of FIG. 2. Sealing member 82 includes a U-shaped portion comprising legs 86 and 88 with gripping fingers 90 and 92, respectively. However, gripping fingers 90 and 92 only grasp flange 80 since there is no door sheet metal at this position. Sealing member 82 also includes a flexible sealing lip 94 which is biased against the inner surface of window 12 to complete the vertical window seal.

As can be seen in FIG. 3, the window frame for fixed window 14 as well as the outer guide for movable window 12 are integrally formed with the modular unit 16 Again, flocking is used where appropriate such as on the sealing lips 74 and 94 and the outer surface of sealing member 82 may be made decorative so as to provide an inner trim member on the vehicle door.

Figure 4:
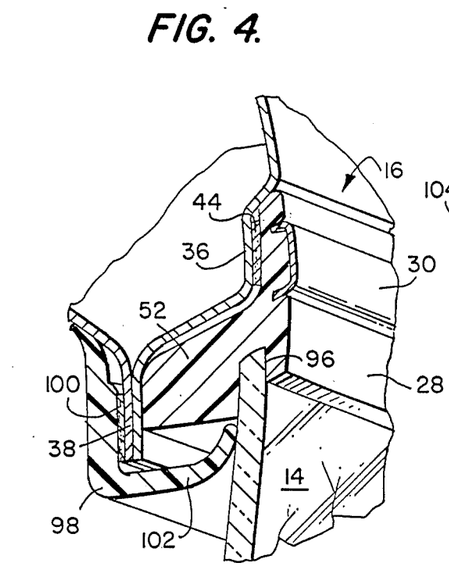
FIG. 4 is a sectional view taken along line 4—4 of FIG. 1.

FIG. 4 shows the details of the upper horizontal portion 28 over the fixed window 14. As can be seen, portion 28 has a contour which matches the contour of the sheet metal of the vehicle door and is glued to the vehicle sheet metal at recess 36 by double-sided tape 44. Also, glue is used to hold the innermost portion 52 against flange 38. However, in this section of the modular unit 16, portion 52 is wide enough to cover the inner surface of window 14 so that window 14 is received in a slot 96. A trim piece 98 is glued over the opposite side of flange 38 by double-sided tape 100. Trim piece 98 has a lip 102 which is pressed against the inner surface of window 14.

Figure 5:
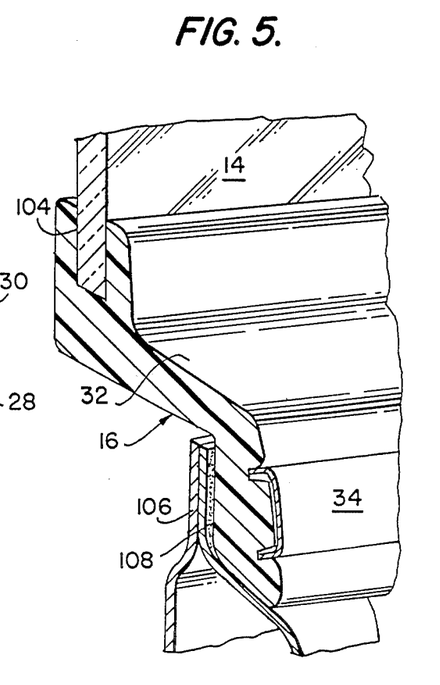
FIG. 5 is a sectional view taken along line 5—5 of FIG. 1.

FIG. 5 shows the lower mounting of window 14. Again, the window is received in a slot. The slot 104 is formed in the lower portion 32 of unit 16. In this case, the design of the door calls for portion 32 to bend inwardly from the door flange 106 which is formed by the inner and outer door sheet metal pieces meeting and being joined in a conventional manner. The lowermost part of portion 32 extends over flange 106 and may be held in place by glue at 108.

Figure 6:
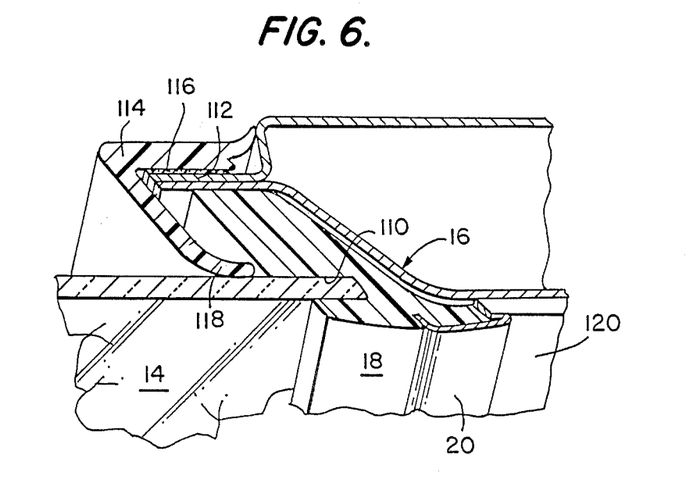
FIG. 6 a sectional view taken along line 6—6 of FIG. 1.

FIG. 6 shows the right-hand edge of window 14 mounted in a slot 110 formed in the vertical portion 18. Portion 18 extends inwardly to abut against a flange 112 formed by the inner and outer door sheet metal pieces. An inner trim element 114 is glued to flange 112 by double-sided tape 116 and includes a flexible end portion 118 which abuts against the inner surface of window 14. In FIG. 6 it will be seen that the trim element 20 extends over another trim element 120 which is mounted on the back edge of the door.

Figure 7:
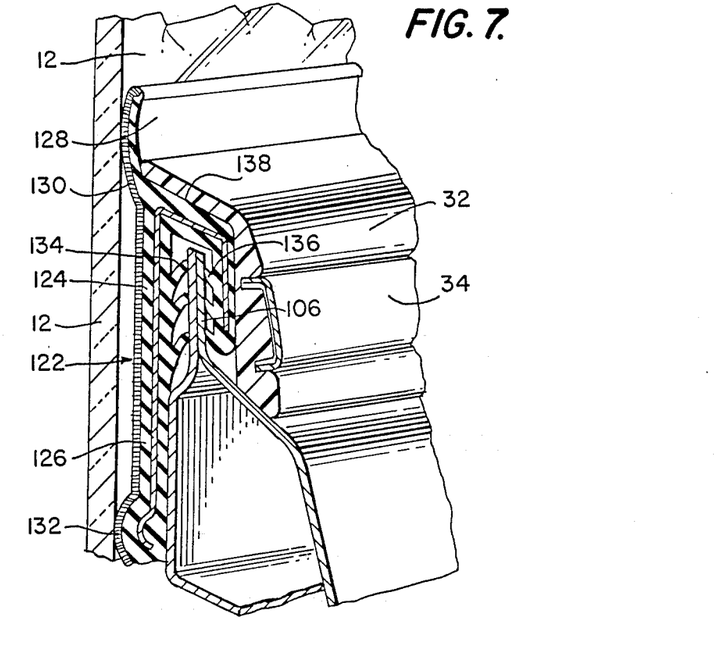
FIG. 7 a sectional view taken along line 7—7 of FIG. 1.

FIG. 7 shows the lower horizontal portion 32 of the modular unit 16. The portion 32 covers a belt seal member 122. The belt seal 122 comprises a U-shaped metal core 124 which is coated with rubber 126 or other soft, pliable material. The coating 126 may be extruded onto the core 124 with an upwardly extending sealing lip 128 being formed during the extrusion process. Flocking 130 is applied over the entire surface of the belt seal 122 facing the window 12. It will be noted that a lower bulge 132 is formed on the belt seal 122 which also contacts the window 12. It will also be noted that gripping fingers 134 and 136 are formed on the belt strip to hold it onto the flange 106.

The horizontal portion 32 of the modular member 16 has an inner surface 138 which conforms to the shape of the outer surface of belt seal 122 so that it may be laid upon the belt seal 122 in a convenient manner. Preferably, the horizontal portion 32 is glued to the belt seal 122.

Figure 8:
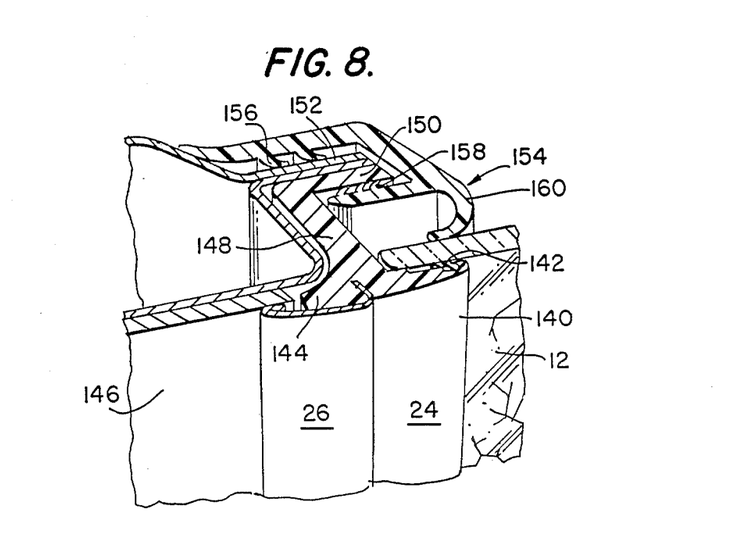
FIG. 8 is a sectional view taken along line 8—8 of FIG. 1.

FIG. 8 shows the left-hand edge of movable window 12 and the left vertical portion 24 of modular member 16. Vertical portion 24 includes a forwardly extending flange 140 which acts as a window guide. A sealing lip 142 is mounted in flange 140 and contacts the window 12 to provide a weather seal. A forwardly extending portion 144 mounts the trim piece 26 which extends over an additional trim piece 146 which is on the forward edge of the door. Portion 24 extends inwardly at 148 to follow the contour of the door sheet metal and contains a terminating flange 150 which is positioned alongside flange 152 of the door. Flanges 150 and 152 are glued together. A sealing member 154 has a U-shaped portion containing gripping fingers 156 and 158 which grasp onto the glued flanges 150 and 152. A sealing lip 160 extends toward and contacts window 12. The sealing lip 160 may be flocked, as is conventional, to assist in reducing friction against the window 12. The entire outer surface of sealing member 154 may be colored or decoratively coated to provide an inner trim element.

It will be understood that the embodiment of the invention shown in FIGS. 1 though 8 has the advantage that virtually the entire outer framework of the window can be manufactured in a single molding step to form modular unit 16. Alternatively, the portions of modular unit 16 can be formed and used individually. The individual portions retain certain advantages which are derived from the basic construction of these pieces. In particular, the two-piece construction discussed with reference to FIGS. 2 and 8 is particularly advantageous. This construction is shown in more detail in FIG. 9 wherein a flange 162 is shown formed from two layers of sheet metal which are connected together in a conventional manner. The outer piece 164 of the two-piece seal construction comprises a U-shaped member having a metal core 166 covered preferably with rubber to form a covering 168. A sealing lip 170 is formed integrally with the covering 168. Flocking 172 is disposed along the inside surface of the coating 168 and on the sealing lip 170.

Figure 9:
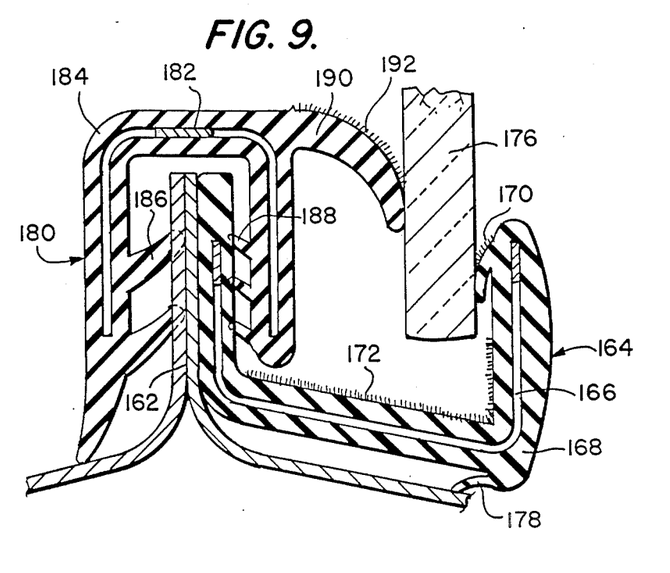
FIG. 9 a sectional view showing the construction details of a two piece sealing element according to invention.

The metal core 166 is preferably a corrosion-resistant metal such as aluminum which can either be stamped or stretch formed. The metal core should be slightly flexible but sufficiently rigid to sustain an outer pressure produced by movement of the window 176. A flexible rubber edge piece 178 is also formed with the coating 168 to fill any gap between member 164 and the sheet metal.

The second member of the two-piece construction is a clamping member 180 which is also U-shaped and has a metal core 182. Core 182, like core 166, is formed of a corrosion-resistant metal. A rubber coating 184 is applied over the core 182. Gripping fingers 186 and 188 are formed integrally with the rubber coating 182 as is sealing lip 190. Flocking 192 is applied to the surface of sealing lip 190 which contacts the window 176.

Cores 166 and 182 may be ribbed or perforated, as shown, in order to increase flexibility so that the two-piece seal may be bent around corners. Alternatively, if the seal is to be preformed to the desired opening, the cores may be rigid and inflexible.

To apply the two-piece seal to a vehicle opening, the member 164 is first held in place with glue being applied between one leg of the U-shaped structure and flange 162. The member 180 is then pushed on so that fingers 186 and 188 grip the flange 162 and the attached leg of member 164.

Figure 10:
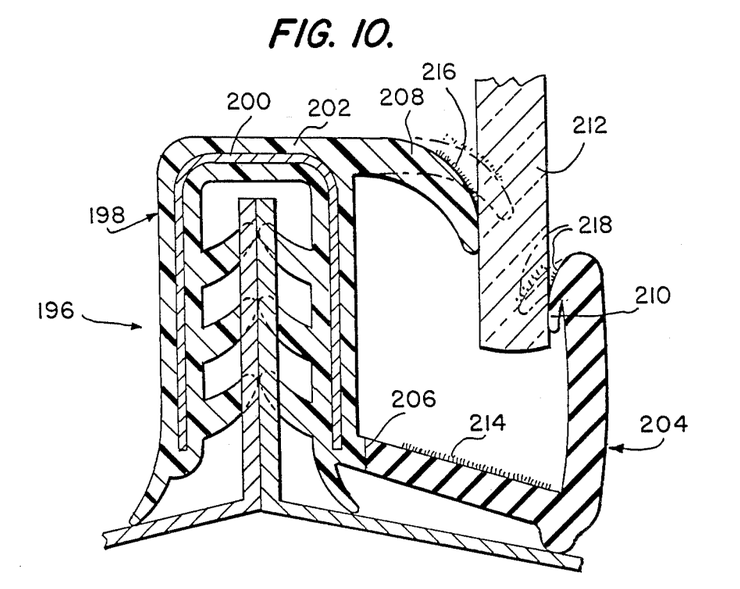
FIG. 10 is a sectional view showing the construction details of a one piece sealing element according to invention.

FIG. 10 shows a one-piece sealing element 196 which comprises a generally S-shaped member having a first portion 198 which includes a metal core 200 formed in a U-shape. Core 200 has a covering 202 formed of a relatively soft material such as polyurethane with a hardness of approximately 60 Durometer on the shore B scale. A second member 204 is formed with an L-shape and attached to the coating 202 at the junction 206. Member 204 can be formed of a harder material such as polyurethane with a hardness of 100 Durometer. Sealing lips 208 and 210 attach to covering 202 and member 204, respectively. It is noted that the sealing lips 208 and 210 are shown both in their positions with window 212 pressed against the sealing lips and in their relaxed positions. Flocking 214 can be applied to the inner surface of member 204 and flocking 216 and 218 can be applied to the sealing lips 208 and 210, respectively.

The one-piece sealing element 196 can be formed by coextrusion wherein the covering 202 is extruded over metal core 200 and the member 204 is extruded simultaneously so as to form a permanent bond at junction 206.

FIG. 10 shows the sealing lip 210 formed integrally with member 204. However, it is preferable for the sealing lip to be substantially softer than 100 Durometer. Moreover, it is preferable to have a sealing lip formed of rubber rather than polyurethane.

Figure 11:
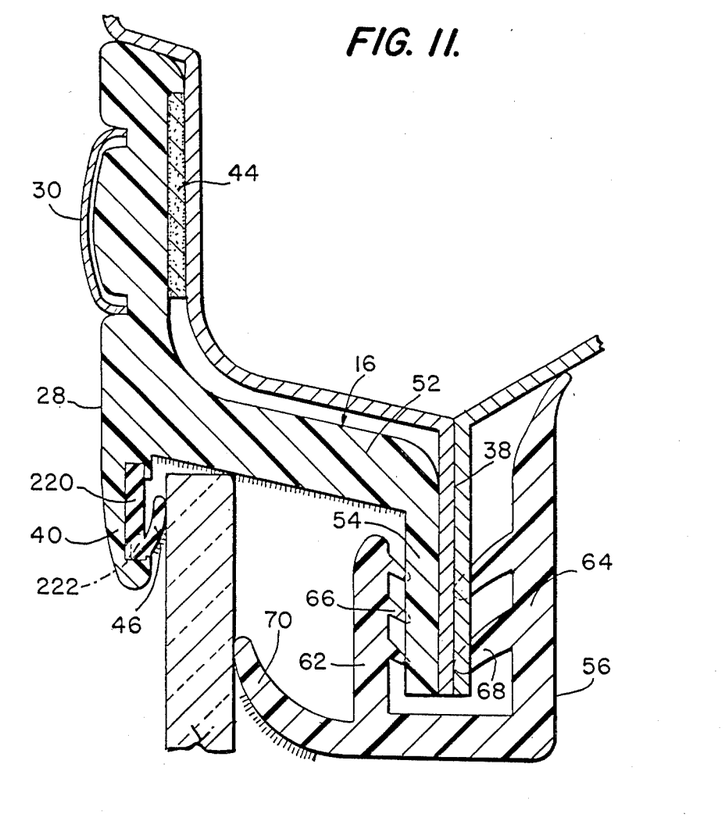
FIG. 11 is a sectional view showing a two-piece sealing element according to the present invention with a flexible sealing lip and trim molding in member of the sealing element.

FIG. 11 shows a two-piece seal similar to that of FIG. 2. In FIG. 11, elements similar to those in FIG. 2 have corresponding reference numerals. In FIG. 11, it will be seen that sealing lip 46 is a separate element which is embedded in flange 40. The sealing element may be an extruded rubber piece with flocking and is formed integrally with a base member 220. Alternatively, a smaller base member shown in phantom at 222 may be used. In either case, the sealing lip 46 with its base member is extruded separately from the molded flange 40. Flange 40 is formed by reaction injection molding integrally with the remainder of unit 16. In order to attach sealing lip 46 with its base member, the sealing lip is mounted in the mold which receives the molding material. The molding material is preferably polyurethane. Accordingly, the member 16 is molded around the sealing lip 46 with its base member so that the sealing lip is held firmly in place. The details of reaction injection molding as well as the molds used therein are well known and will not be discussed herein.

Figure 12:
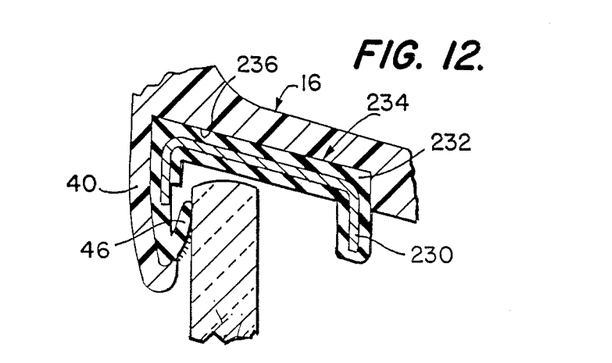
FIG. 12 is a fragmentary view showing the sealing element of FIG. 11 with an alternate sealing lip construction.

FIG. 12 shows an alternate embodiment wherein the sealing lip 46 is extruded onto a metal core 230. Core 230 is generally U-shaped and is covered with a rubber coating 232. The sealing lip 46 is integral with this rubber coating. The rubber coating, sealing lip and metal core form an insert 234. When the unit 16 is molded, an indentation 236 is formed into which the insert 234 fits. Insert 234 is then attached during a post-assembly process by gluing into place. In this form of the invention, a separate, flexible sealing lip is provided. Also, additional rigidity is obtained by the metal core 30.

As will be readily apparent, the techniques discussed relative to FIGS. 11 and 12 for adding sealing lips can be applied to any of the other embodiments of the invention. These attachment techniques are most useful where the body of the member is formed of a hard material such as 100 Durometer polyurethane. This type of material is used when no metal core is present. Alternatively, as shown in FIG. 9, metal cores may be provided in both parts of a two part sealing member such that the sealing lip does not need to be formed of a different material from that which coats the metal Normally, the U-shaped member which provides the clamping action, such as member 108 of FIG. 9 will have a metal core in order to provide a proper clamping effect. Accordingly, the sealing lips on these members may be extruded along with the coating material, which is normally of rubber.

Figure 13:
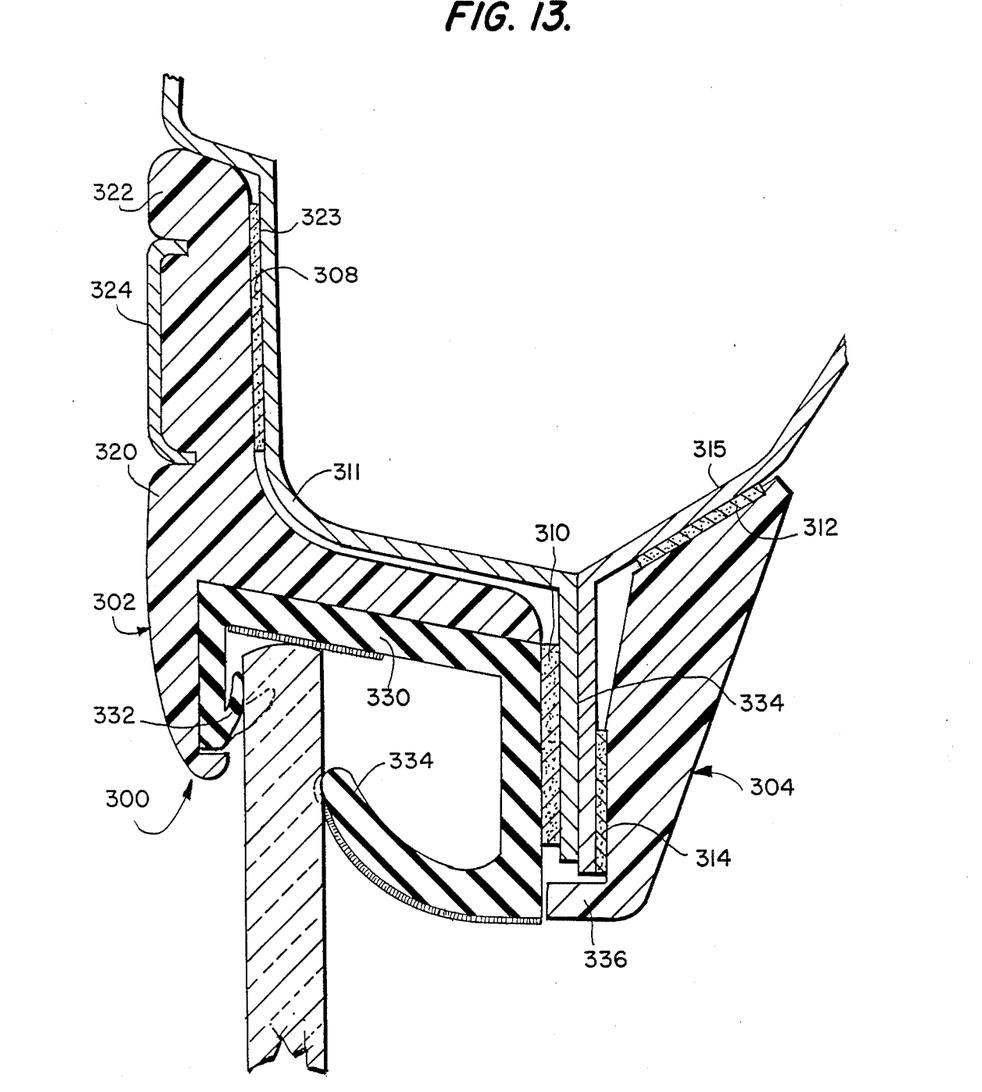
FIG. 13 is a sectional view showing an alternate embodiment of the seal structure of the present invention.

FIG. 13 shows an alternate embodiment of the seal structure of the invention, as shown in FIG. 2, except that there is no element corresponding to element 56 of FIG. 2. Rather the structure 300 of FIG. 13 includes a sealing member 302 and a separate trim piece 304.

It will be understood that the sealing member 302 can be a part of a one-piece unitary molded outer sealing unit such as unit 26 of FIG. 1. However, in the case of sealing member 302, adhesive in the form of, for example, double-sided tape pieces 308 and 310 are only used to hold the structure in place on the vehicle body metal 311. Two additional pieces of double-sided tape 312 and 314 are used to hold the trim piece 304 in place on the interior of the vehicle against the vehicle body panel 315.

The sealing member 302 is composed of a hard extruded body member 320 which can be made by reaction injection molding polyurethane with a hardness of 100 Durometer on the shore D scale. The body is formed to have an integral trim portion 322 which extends upwardly into a recess 323 on body panel 311 and mounts a trim element 324. As with the unit 26 in FIG. 1, the body 320 can be a part of an entire integrated unit which includes functional elements such as mirror housings and the like as well as trim pieces so that virtually the entire upper door panel is molded in one operation. This facilitates manufacture of the door since the upper portion of the door need not have a class A finish since this portion of the door would be covered by the integral unit.

Bonded to the body member 320 is a sealing member 330 which includes sealing lips 332 and 334 and is formed from a softer material such as rubber so that the sealing lips will be pliable. The entire sealing member 330 may be formed as a unit or, as discussed above relative to FIG. 11, the sealing lips may be embedded into the harder polyurethane body.

The trim piece 304 may be formed of rubber, urethane or any other suitable material. This piece serves no function other than to cover the flange 334 in a decorative manner so as to make the window frame appear attractive from inside the vehicle. For this purpose, the trim member has an extension 336 which extends over the edge of the flange so that the side and edge of the flange are covered in an attractive manner.

Figure 14:
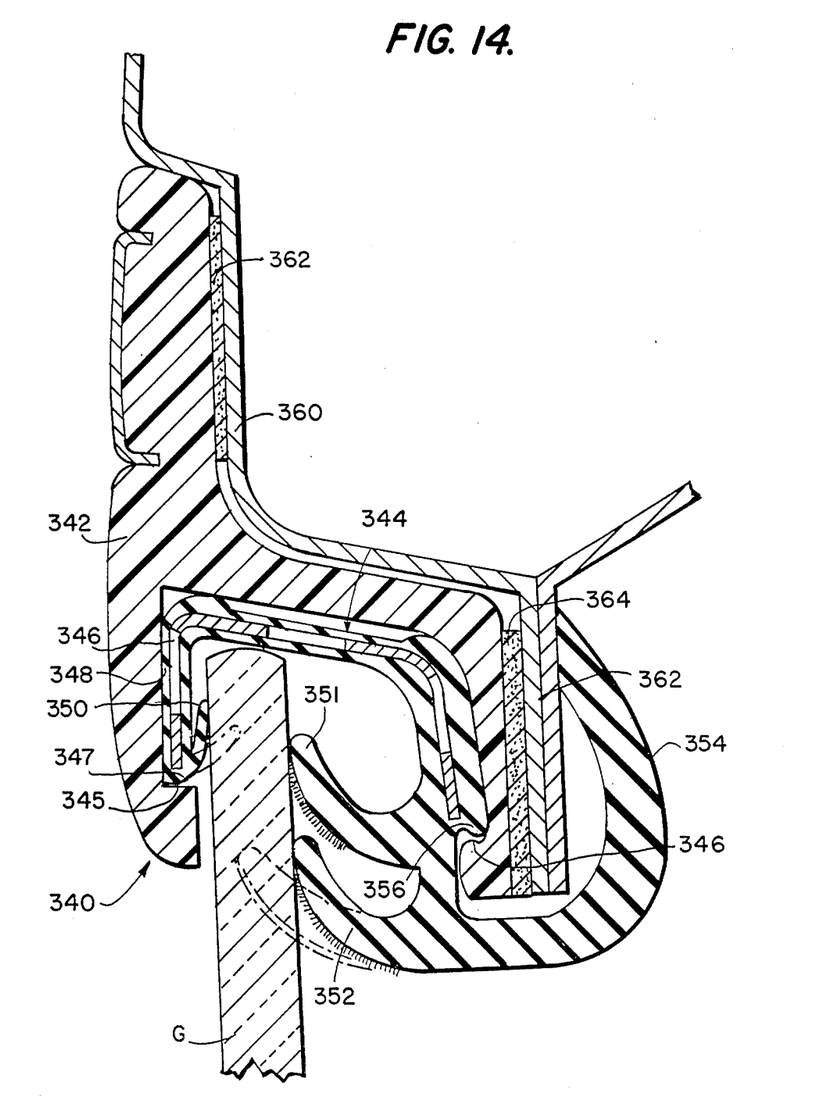
FIG. 14 is a sectional view of another sealing structure according to the present invention.

FIG. 14 shows an alternate structure 340 which can be used in place of the structure 300 in a unitary construction such as that shown in FIG. 1 Structure 340 is similar to structure 300 in that it has a body 342 formed of relatively hard urethane. Nevertheless, the body 342 is U-shaped at the lower portion and includes indented portions 345 and 346 at the ends of the U. A sealing member 344 is held in the U by snap action.

The sealing member 344 has a metal carrier 346 which is embedded in a rubber coating 348. The metal carrier is punched to make it flexible. Also, the sealing member 344 includes a free end 347 and a protruding latching piece 356. The rubber coating 348 forms sealing lips 350, 351 and 352 as well as a trim piece 354 and latching piece 356 which fits in the recess 346.

The body 342 is attached to the metal panel 360 by an adhesive in the form of double-sided tape 362 and 364. The sealing member 344 is inserted in the body 342 by pushing it past the recesses 345 and 346 until the latching piece 356 snaps into the recess 356 and the free end 347 snaps in place in the recess 345. This causes the trim piece 354 to extend over the flange 362 and provide a decorative interior appearance.

It is noted that the sealing member 344 has two inner sealing lips 351 and 352 and a single outer sealing lip 350. The two inner sealing lips 351 and 352 provide a positive contact against the moving glass G to ensure that air, water and the like are sealed out. Flocking may be added to the sealing lips and to any other surfaces where it may be necessary to aid in movement of the sliding window.

Figure 15:
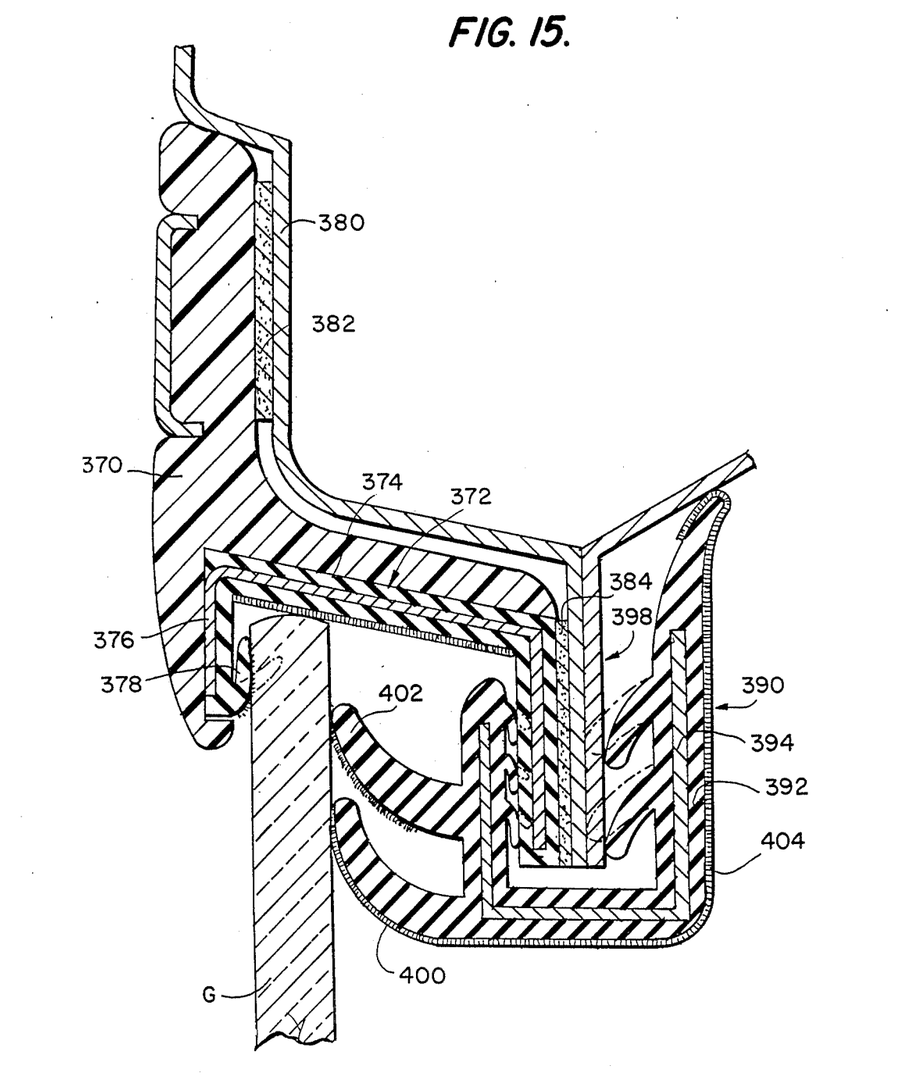
FIG. 15 is a sectional view of a further sealing structure according to the present invention.

The embodiment of FIG. 15 has characteristics of several of the previously discussed structures. There is a body 370 formed of hard polyurethane and a sealing member 372 formed of rubber 374 over a metal carrier 376. The sealing member includes an outer sealing lip 378 which is preferably flocked. The body 370 is held to the car body panel 380 by an adhesive in the form of double-sided sticky tape 382 and the sealing member 372 is bonded to the body 370. Another piece of double-sided tape 384 holds the sealing member 372 to the body panel 380. A second sealing member 390 is formed by a rubber coating 392 extruded over a metal carrier 394. The sealing member 390 acts as a fixation profile and attaches by applying clamping pressure to the inside of the sealing member 372 and to one side of the flange 398. A pair of sealing lips 400 and 402 extend toward and make contact with the window glass G. Flocking is applied to the sealing lips and to the inside of the sealing members as necessary to assist in movement of the sliding glass. Also, a decorative coating 404 is applied over the outside of the sealing member 390 to present a decorative appearance to the inside of the automobile. The decorative coating may comprise additional flocking material, a fabric covering or the like.

It is to be noted that the sealing member 372 of FIG. 15 is similar to the insert 234 of FIG. 12 and the sealing member 390 of FIG. 15 is similar to the clamping member 180 of FIG. 9 except for the addition of a further sealing lip.

As discussed above, FIG. 1 shows a unitary construction in the form of sealing unit 16 which can be formed in a single molding process. The unit 16 can have a cross section similar to any cross section in the subsequent drawings. FIGS. 16–19 show a window sealing and guiding unit for a fixed window and a movable window which is formed of a plurality of individual pieces connected together. There are three vertical sealing and guiding pieces 410, 412 and 414 and two horizontal pieces 416 and 418. Each piece has a metal carrier which is preferably aluminum and has an extruded rubber covering.

Figure 18:
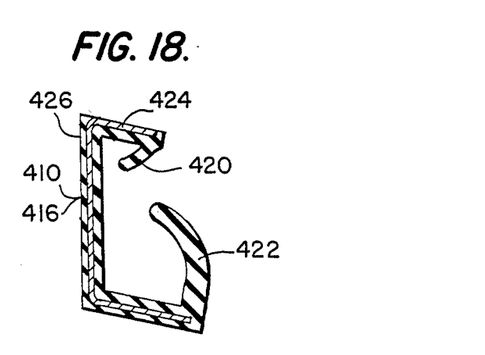
FIG. 18 is a sectional view taken along line 18—18 of FIG. 16.

As shown in FIG. 18, the vertical piece 410 and the horizontal piece 416 have the same cross-sectional profile and include an outer sealing lip 420 and an inner sealing lip 422. The metal carrier 24 is bent into a U-shape and is covered by rubber 426.

Figures 16, 17:
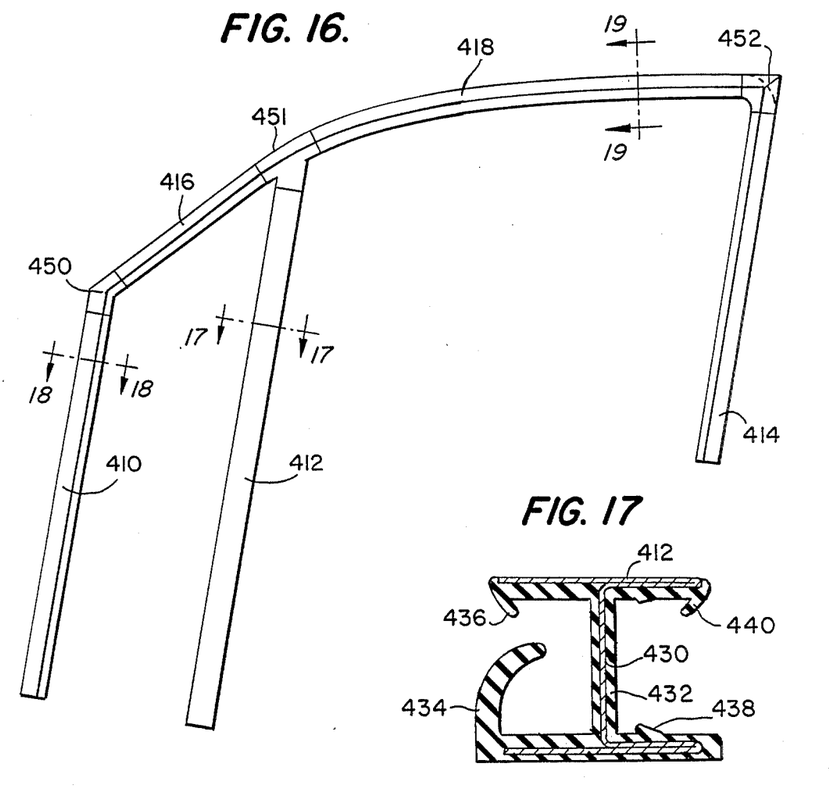
FIG. 16 is a side elevational view of a modular sealing element according to the present invention.
FIG. 17 is a sectional view taken along line 17—17 of FIG. 16.

The vertical piece 412 is shown in FIG. 17 to have a carrier 430 which is bent to form two opposed U-shaped channels. The carrier 430 is covered with an extruded rubber coating 432. The rubber covering forms an interior sealing lip 434 and an exterior sealing lip 436 on one side and two small sealing lips 438 and 440 on the other side.

Figure 19:
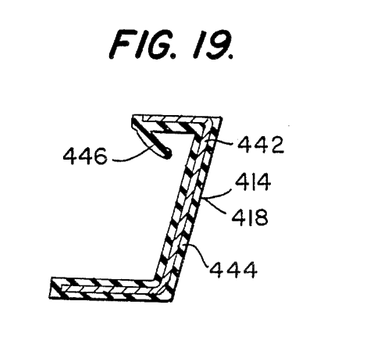
FIG. 19 is a sectional view taken along line 19—19 of FIG. 16.

FIG. 19 shows the cross-sectional profile of the vertical piece 414 and the horizontal piece 418. These pieces contain a metal carrier 442 bent into a U-shape and covered with an extruded rubber coating 444. The rubber coating forms an exterior sealing lip 446.

The various pieces are formed individually and connected together using molded rubber corners 450–452. The molded rubber corners are glued to the individual pieces to produce a complete unit ready for installation in an automobile.

It should be noted that in the case of each of the pieces 410, 412, 414, 416 and 418, the carrier should be formed of aluminum and should be relatively rigid. The aluminum should be relatively heavy and should have no punch outs. In this manner, the carriers will be sufficiently stiff to act as window guides with no support from the door frame. It also should be noted that the rubber coating should be glued to the carrier in each instance to ensure a firm connection between the carriers and the rubber.

The unit shown in FIG. 16 can be held in place by the use of double-sided tape. In addition, interior trim pieces should be added. The trim pieces could be in the form of sealing members 390 shown in FIG. 15 and provide the interior sealing lips in the case of pieces 414, 418 and the right-hand side of piece 412, as shown in the drawing.

As with other forms of the invention discussed above, flocking can be added where necessary to reduce friction and improve the sliding ability of the movable window glass. In the case of the structure in FIG. 16, the movable window would be positioned between the pieces 412 and 414 while the window between the pieces 410 and 412 would be fixed. Accordingly, flocking would be added only to the pieces used for the movable window.

The foregoing description is set forth for purposes of illustrating the present invention but is not deemed to limit it scope. Clearly, numerous additions, substitutions and other changes may be made to the present invention without departing from the scope thereof, as set forth in the appended claims.

What is claimed is:

1. A structure for windows in an automobile, comprising:
    a sealing and guiding member having an exposed exterior surface and having a plurality of vertical members interconnected by at least one horizontal member to form an integral member, part of said sealing and guiding member having a single inner flange and an outer flange;
    means for holding said sealing and guiding member to a surface of an automobile body flange so that the single inner flange rests against an outer surface of said body flange;
    an interior trim piece having a surface for facing an interior of a vehicle; and
    means for holding said interior trim piece to a surface of said automobile body flange.

2. A structure according to claim 1, wherein said vertical and horizontal members are separate members joined to each other.

3. A structure according to claim 1 wherein said sealing and guiding member includes a U-shaped portion having two walls with recesses, and including an insert which snap fits in said recesses, said insert being connected to said trim portion for holding said trim portion in a position extending away from said U-shaped portion.

4. A structure according to claim 1, wherein said sealing and guiding structure includes a downwardly opening U-shaped portion and exterior trim pieces including at least an upwardly extending window molding trim piece which extends upwardly from an upper part of said downwardly opening U-shaped portion.

5. A structure according to claim 4, wherein said means for holding said sealing and guiding member to said surface of said flange includes an adhesive.

6. A structure according to claim 4, wherein said interior trim piece includes means for clamping to said flange which forms said means for holding said interior trim piece.

7. A structure for windows in an automobile, comprising:
    a sealing and guiding member having an exposed exterior surface and having a plurality of vertical members interconnected by at least one horizontal member to form an integral member;

means for holding said sealing and guiding member to a surface of an automobile body flange;

an interior trim place having a surface for facing an interior of a vehicle;

exterior trim pieces including at least an upwardly extending window molding trim piece; and means for holding said interior trim piece to a surface of said automobile body flange, wherein said interior trim piece includes means for clamping to said flange to form said means for holding said interior trim piece and wherein said means for clamping to said flange also clamps said sealing and guiding member to said flange to form said means for holding said sealing and guiding member.

8. A structure for windows in an automobile, comprising:

a sealing and guiding member having an exposed exterior surface and having a plurality of vertical members interconnected by at least one horizontal member to form an integral member;

means for holding said sealing and guiding member to a surface of an automobile body flange;

an interior trim piece having a surface for facing an interior of a vehicle; and means for holding said interior trim piece to a surface of said automobile body flange wherein said interior trim piece is attached to said flange separately from said sealing and guiding member and said means for holding said interior trim piece to said flange includes an adhesive.

9. A structure according to claim 8, wherein said sealing and guiding structure vertical and horizontal members comprise a unitary molded synthetic resin body and including softer sealing lips mounted on said unitary molded synthetic resin body.

10. A structure according to claim 9, wherein said vertical and horizontal members define at least three sides of at least two window openings.

11. A structure according to claim 10, wherein said horizontal member includes at least one upwardly extending trim flange and at least one downwardly extending window sealing flange.

12. A structure for a flush mounted window for a motor vehicle, comprising:

a guiding member having a generally U-shaped portion for receiving and guiding a vehicle window, said guiding member having two opposed walls, each of said walls having a recess;

a sealing and trim member having portions which snap fit within said recess and having a trim portion extending away from said U-shaped portion for covering an inside surface of a window frame.

13. A structure for windows in an automobile, comprising:

a sealing and guiding member having an exposed exterior surface and having a plurality of vertical members interconnected by at least one horizontal member to form an integral inner surface;

means for holding said sealing and guiding member to a surface of an automobile body flange such that said extreme inner surface rests against said body flange;

an interior trim piece having a surface for facing an interior of a vehicle; and means for holding said interior trim piece to a surface of said automobile body flange.

14. A structure for windows in an automobile, comprising:

a sealing and guiding member having an exposed exterior surface and having a plurality of vertical members interconnected by at least one horizontal member to form an integral member;

means for holding said sealing and guiding member to a surface of an automobile body flange;

an interior trim piece having a surface for facing an interior of a vehicle; and means for holding said interior trim piece to a surface of said automobile body flange such that said interior trim piece is attached to said flange separately from said sealing and guiding member.

* * * * *

UNITED STATES PATENT AND TRADEMARK OFFICE
CERTIFICATE OF CORRECTION

PATENT NO. : 4,800,681

DATED : January 31, 1989

INVENTOR(S) : Skillen et al

It is certified that error appears in the above-identified patent and that said Letters Patent is hereby corrected as shown below:

On sheet 1, Figure 3, please change the number "79" to read --74--.

Signed and Sealed this

Thirty-first Day of October, 1989

Attest:

DONALD J. QUIGG

Attesting Officer

Commissioner of Patents and Trademarks